US005546057A

United States Patent [19]

Pfitzenmaier

[11] Patent Number: 5,546,057
[45] Date of Patent: Aug. 13, 1996

[54] ANTENNA/FILTER COMBINER

[75] Inventor: Gerhard Pfitzenmaier, Groebenzell, Germany

[73] Assignee: Aktiengesellschaft Siemens, Munich, Germany

[21] Appl. No.: 405,445

[22] Filed: Mar. 16, 1995

Related U.S. Application Data

[63] Continuation of Ser. No. 271,760, Jul. 7, 1994, abandoned.

[30] Foreign Application Priority Data

Jul. 8, 1993 [DE] Germany .......................... 43 22 843.7

[51] Int. Cl.$^{6}$ .............................. H04B 1/04; H01P 1/213

[52] U.S. Cl. .......................... 333/134; 333/1.1; 333/135; 455/103

[58] Field of Search .......................... 333/1.1, 126, 129, 333/132–135, 202, 208, 209, 211, 219.1; 455/3.1, 3.3, 6.1, 103

[56] References Cited

U.S. PATENT DOCUMENTS

| | | | |
|---|---|---|---|
| 3,435,358 | 3/1969 | Rheinfelder | 455/3.3 X |
| 3,865,990 | 2/1975 | Kuenemund | 333/134 X |

FOREIGN PATENT DOCUMENTS

| | | |
|---|---|---|
| 0262391 | 8/1993 | European Pat. Off. . |
| 1158914 | 6/1958 | France . |
| 974386 | 2/1960 | Germany . |
| 4024480 | 2/1992 | Germany . |
| 05029806 | 2/1993 | Japan . |

OTHER PUBLICATIONS

S. Kazeminejad, et al., Electronic Letters, 16 Jul. 1987, Vol. 23, Nov. 15, p. 812, "Base Station Mutlicoupler Design for UK Cellullar Radio Systems."A. E. Atla, IEEE Transactions on Microwave Theory and Techniques, Mar., 1974, pp. 332–336, "Computer–Aided Design of Wave Guide Multiplexers."G. Ensslin, et al., Telecom Report 10 (1987) Special Radio Communications, pp. 146–151, "Channel Branching Filters for Wide Band Radio Relay Systems".

D. Doust, et al. Microwave Journal, "Satellite Multiplexing Using Dielectric Resonator Filters", vol. 32, No. 12 (1989), pp. 93–106.

K. Wada, et al., 15th European Microwave Conference Proceedings, Sep. 9–13, 1985, Paris, France, Microwave Exhibitions and Publishers, Ltd., Tunbridge Wells, GB, 1985, "Wideband Tunable DR VCOO", pp. 407–412.

M. Kunes, et al., 19th European Microwave Confeerence Proceedings, Sep. 4–7, 1990, London, Great Britain, Microwave Exhibitions and Publishers, Ltd., Tunbridge Wells, GB, 1989, "A Digitally Controlled Tunable High Power Output Filter for Space Applicatoins, pp. 681–686".

*Primary Examiner*—Paul Gensler
*Attorney, Agent, or Firm*—Hill Steadman & Simpson

[57] ABSTRACT

An antenna/filter combiner for connecting a plurality of frequency transmission signals to an antenna having an arrangement with n circulators connected in a waveguide with m transmission channels being supplied thereinto via respective combining networks composed of sub-filters to provide a reactance free combination of n·m transmission frequency channels.

10 Claims, 3 Drawing Sheets

ANTENNA/FILTER COMBINER

This is a continuation of application Ser. No. 08/271,760, filed Jul. 7, 1994 now abandoned.

BACKGROUND OF THE INVENTION

The present invention is directed to antenna/filter combiners for connecting a plurality of frequency channels to a transmission antenna.

In mobile telephone systems, high power signals that are allocated to extremely narrow band frequency channels must be combined free of reaction or cross-talk and supplied to the transmission antennas in base stations. The plurality of frequency channels generally should be modularly expandable depending on the configuration level and, on the other hand, each transmission filter must be capable of being at least briefly tuned to every declared channel frequency during operation, without loss of signal quality.

High-Q resonators can be considered especially beneficial as low loss transmission filters because of the operation of current mobile radio telephone systems in the giga Hertz (GHz) range and because of the extremely narrow channel bandwidths used. The spatial expanse of such a system, however, only allows an ideal electrical combination of the transmission filters directly and punctiform (i.e., having the form or character of a point) at their outputs that is desired in the sense of a diplexer with what in part are substantial disturbances.

For different reasons, known solutions for diplexers in the microwave frequency range do not optimally solve the disclosed problem. For example, the article "Base Station Multicoupler Design for UK Cellular Radio Systems" by S. Kazeminejad, et al., which appeared in "Electronic Letters", 16 Jul. 1987, Vol. 23, November 15, page 812, proposed that the connection points of two transmission filters to an antenna line be provided with a half wavelength spacing therebetween. This spacing is fixed and is dependent on the frequency position of the filter. It would have to change correspondingly in a non-accomplishable way given signal echoing or returning of the filters. The clear function of the diplexer is, therefore, not assured given the interconnection of a plurality of transmission filters in this manner. Over and above this, the resulting structure is bulky and modular expandability is questionable.

Waveguide branching of separating filters is disclosed, for example, in the article "Computer-Aided Design of Wave Guide Multiplexers" by A. E. Atia, which appeared in "IEEE Transactions on Microwave Theory and Techniques", March 1974, pages 332–336. These filters have proven themselves in satellite and radio link technology. The filters are coupled to a waveguide shorted at the end, whereby, however, the spacing between the coupling planes (or levels) of the filters depend on their frequency positions, and, thus, are electrically significant and would likewise have to assume different values given filter echoing or returning in the separating filter. Additionally, the waveguide dimensions are relatively large for mobile radio telephone systems that currently operate between 0.9 GHz and 1.8 GHz and thus do not allow for compact structuring of the separating filters.

Channel branching filters with circulators have been utilized in radio link technology, as is known, for example, from the article "Channel Branching Filters for Wide Band Radio Relay Systems" by G. Ensslin, et al., which appeared in Telecom Report 10 (1987), Special "Radio Communication", pages 146–151. Modular structuring would appear possible with these filters. However, due to the relatively great number of circulators in the mechanical arrangement in the chain of channel branching filters—one circulator being allocated to each individual filter—many circulator passes and, thus, high signal attenuation results for every individual frequency channel. And high costs are presented by the use of so many circulators so that this solution cannot be considered as an optimum solution for purposes of mobile radio telephone systems.

SUMMARY OF THE INVENTION

The present invention provides an antenna/filter combiner with a simple structure having low-loss transmission filters.

To that end, in an embodiment the invention provides an antenna/filter combiner for connecting a plurality of frequency channels to a transmission antenna, characterized by n circulators connected into a waveguide leading to the antenna, and $\mu$ transmission channels being fed into the third gate (or port) of each circulator via respective combining networks composed of $\mu \leqq m$ interconnected sub-filters, the signal flow direction of the circulators being utilized such that frequency channels already fed in at topically preceding circulators 1 to ($\beta$–1) in the course of the waveguide are at least approximately totally reflected at the combining network of the $\beta^{th}$ circulator and are forwarded in the direction to the antenna via further circulators ($\beta$+1) to n.

In an embodiment of the invention, the sub-filters of each and every combining network comprise high-Q resonators.

In an embodiment of the invention, the resonators are operated with at least two modes.

In an embodiment of the invention, for a given combining network, the apex comprises a second waveguide coupled to its respective circulator and the sub-filters are physically arranged concentrically about the second waveguide and having resonator axes positioned axially parallel to an axes of the second waveguide, filter outputs of the resonators being coupled to the second waveguide.

In an embodiment of the invention, the second waveguide is a coaxial cable.

In an embodiment of the invention, the combining network further comprises compensation means for compensating disturbances caused by blocking combining networks in a pass region of a transmitted channel, which compensation means are provided in the second waveguide at a side thereof facing away from the circulator.

In an embodiment of the invention, the second waveguide is a coaxial line, and the coaxial line is shorted at an end with a protruding inside conductor and attached to a junction of the outputs of the various resonators.

In an embodiment of the invention, the protruding inside conductor protrudes sufficiently so as to be slightly bent to minimize stressing thereof.

In an embodiment of the invention, the combining network comprises a housing formed out of a single metal block.

In an embodiment of the invention, the combining network comprises a housing made out of a metallized plastic block.

In an embodiment of the invention, a resonator includes a dielectric resonator operated with orthogonal modes formed as a highly selective two-circuit filter.

In an embodiment of the invention, the dielectric resonator comprises a two-part resonator each part forming a resonator half, each resonator half having approximately the same thickness and approximately the same external dimensions, at least one of the resonator halves being axially displaceable relative to the other resonator half.

In an embodiment of the invention, the combining networks comprise three sub-filters each.

In an embodiment of the invention, the combining networks comprise two sub-filters each.

In an embodiment of the invention, the combining networks comprise four sub-filters each.

These and other features of the invention are set forth in greater detail below in the following detailed description of the preferred embodiments with reference to the accompanying drawings.

DETAILED DESCRIPTION OF THE PRESENTLY PREFERRED EMBODIMENTS

Figure 1:
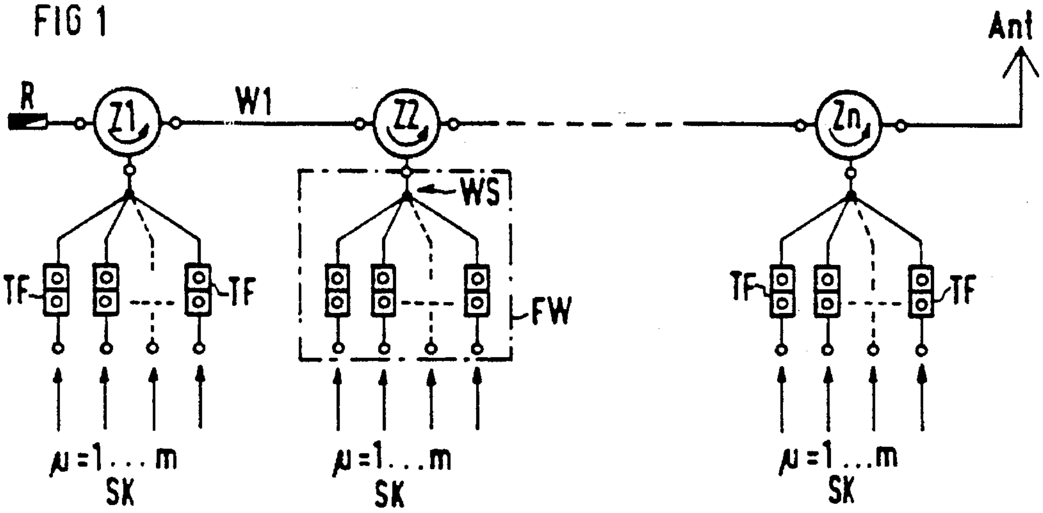
FIG. 1 is a block diagram of an antenna/filter combiner.

FIG. 1 illustrates a block diagram of a circuit of a modularly structurable antenna/filter combiner for reaction-free or cross-talk-free combination of a maximum of n·m transmission frequency channels. As illustrated, in a waveguide W1 which preferably is a coaxial line, n circulators Z1, Z2 . . . Zn (referred to generally herein as circulators Z) are connected in series, and $\mu(1 \leqq \mu \leqq m)$ transmission channels SK are fed into a third port or gate of each circulator via a respective combining network FW. The waveguide W is terminated on one end by a transmission antenna Ant and on the other end by a resistor R selected to provide a suitable terminator impedance. In FIG. 1 a combining network FW is illustrated by a broken line only for circulator Z2, but should be understood to be present for all of the illustrated circulators.

As illustrated, each combining network FW comprises $\mu \leqq m$ interconnected sub-filters TF. The signal flow direction of the circulators Z is employed such that the frequency channels already fed in at preceding circulators Z1 . . . (β−1) along the waveguide W1 are at least approximately totally reflected at the combining network of the $\beta^{th}$ circulator and are forwarded in the direction of the antenna Ant via potentially further circulators (β+1) . . . n wired with combining networks.

The $\mu \geqq 2$ sub-filters TF of each and every combining network FW advantageously are constructed of high-Q resonators, for example, coaxial resonators, helix resonators, hollow metallic waveguide resonators, dielectric resonators, and/or HTSL (High Temperature Super Conductor) resonators. Depending on the physical conditions of the system, the resonators can be operated with two or more modes, for example, orthogonal modes in the case of hollow waveguide resonators or, respectively, dielectric resonators.

Figure 2:
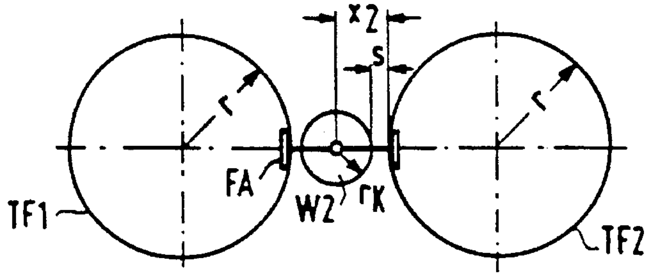
FIG. 2 illustrates a first arrangement of filters in a frequency diplexer.
Figure 3:
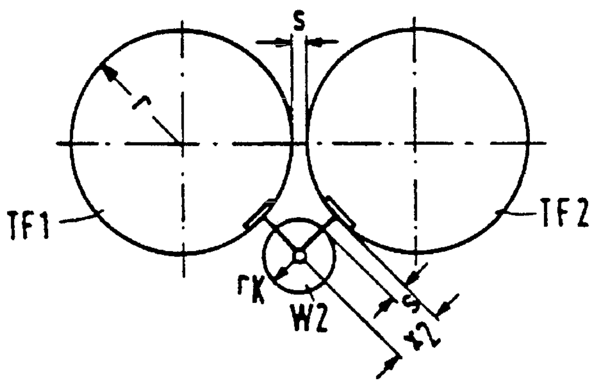
FIG. 3 illustrates a second arrangement of filters in a frequency diplexer.

The sub-filters TF of each combining network FW are arranged concentrically and—relative to the resonator axes—axially parallel around a second waveguide W2 which forms an apex WS of the combining network. FIGS. 2–5 illustrate schematically various arrangements having different pluralities of such sub-filters TF. In FIGS. 2 and 3, m=2, in FIG. 4 m=3 and in FIG. 5 m=4. These arrangements of the sub-filters are undertaken for the purposes of supplying the filter outputs to the second waveguide W2 on the electrically shortest path, and, thus, with little interference and independent of frequency to the farthest-reaching extent for the purposes of a center frequency echoing or returning.

It can be appreciated that the other end of each second waveguide W2 is provided with a connector with a direct, optimally short connection to the third port or gate of the circulator Z to which it is connected.

The second waveguide W2 preferably is comprised of a modified coaxial line.

Figure 6:
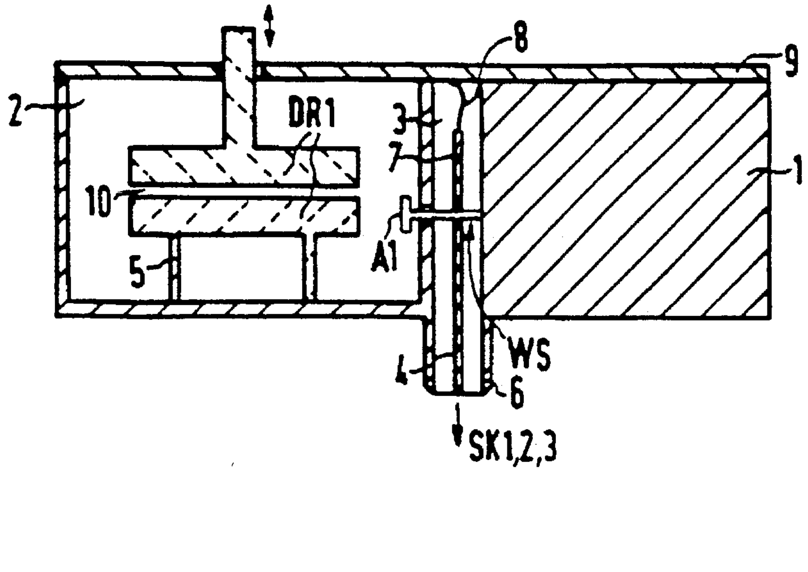
FIG. 6 is a sectional view of a three-channel combining network taken generally along the line VI—VI in FIG. 7.
Figure 7:
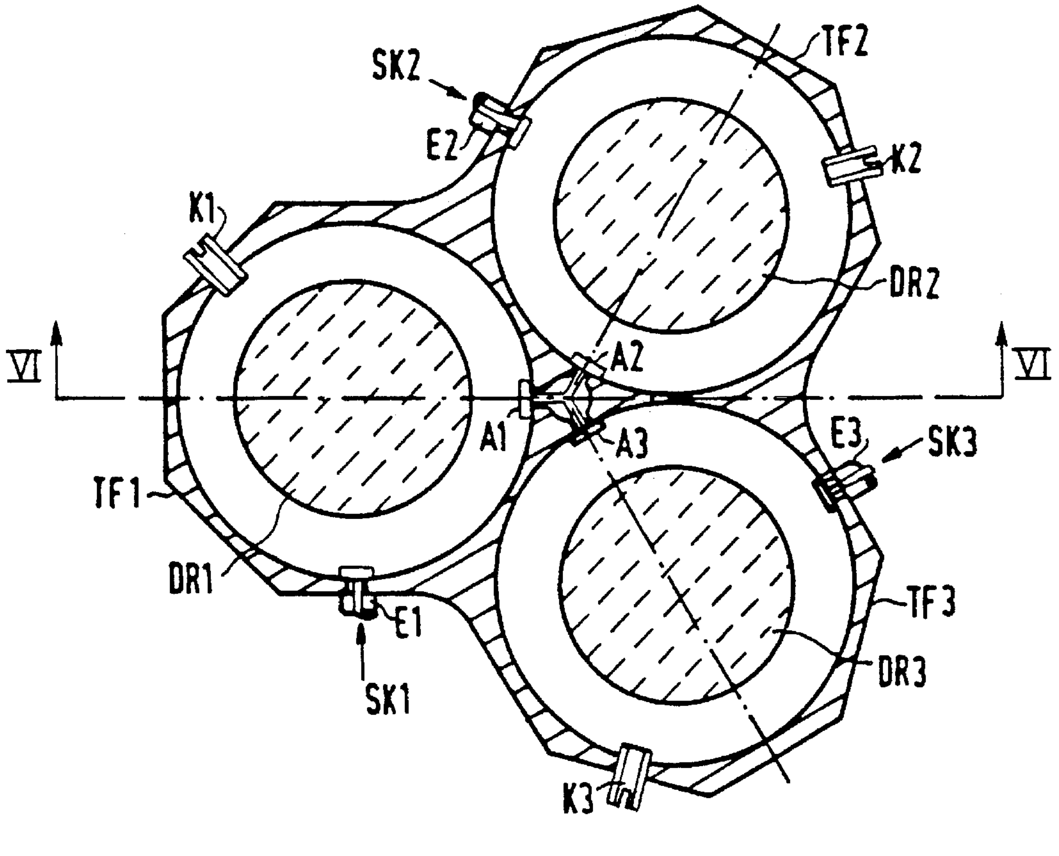
FIG. 7 is another sectional view of the three-channel combining network of FIG. 6.

A more detailed illustration of a combining network arrangement is shown in FIGS. 6 and 7 and is described below in conjunction with reference to those figures.

First, however, as noted above, FIGS. 2–5 show various arrangements of sub-filters in a combining network having 2, 3 or 4 sub-filters. In FIGS. 2 and 3, two sub-filters TF1 and TF2 are provided. The two sub-filters TF1 and TF2 are positioned such that their central axes are aligned in one plane with the inside conductor of the central coaxial line of the second waveguide W2 arranged between them. In FIG. 2, the central axis of the waveguide W2 also lies in the plane. In FIG. 3, the second waveguide W2 is arranged outside the plane.

As illustrated in both FIG. 2 and FIG. 3, the filters have resonators and the radius of the filter resonators is designated r; the radius of the outside conductor of the second waveguide is designated $r_k$. The resonators have a filter output FA in a region that lies directly opposite the second waveguide W2. The electrically effective length from the filter output FA to the inside conductor of the second waveguide (the separating network apex WS) is designated x. For the combining networks having the two sub-filters, the relationship: $x^2=r^k+s$ holds true, s being the thickness of the material between the filter resonator and the second waveguide W2. It should be understood that the filter inputs are not illustrated in FIGS. 2–5.

Figure 4:
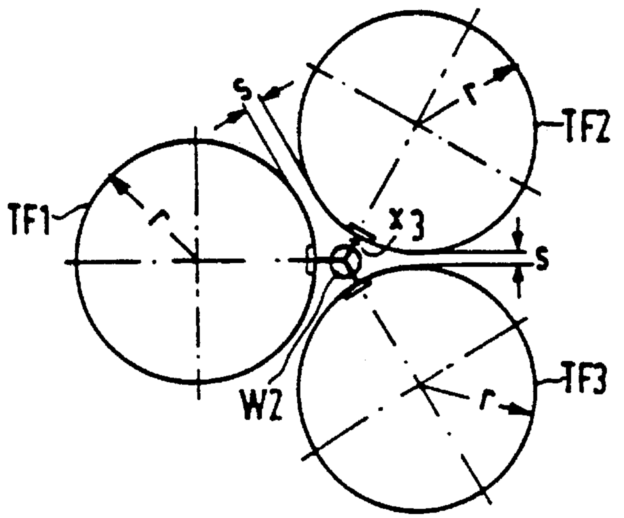
FIG. 4 illustrates a third arrangement of filters in a frequency diplexer.
Figure 5:
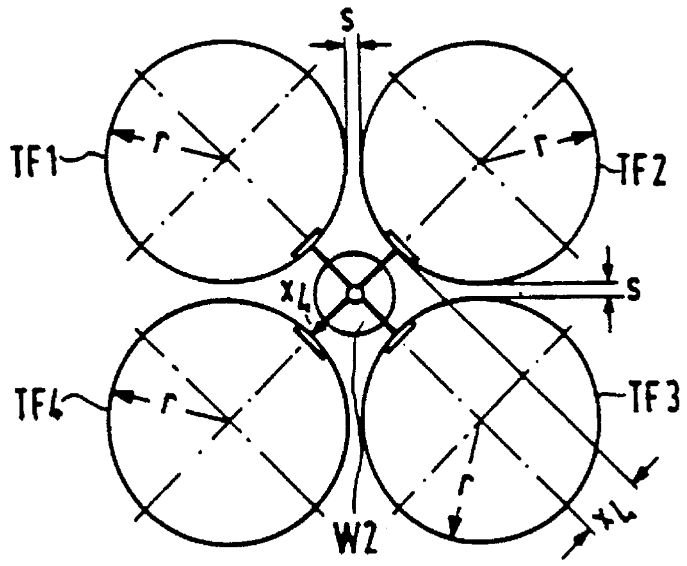
FIG. 5 illustrates a fourth arrangement of filters in a frequency diplexer.

In FIG. 4, three sub-filters are provided and m=3. In FIG. 5, four sub-filters are provided and m=4. In both figures, the sub-filters are arranged around the second waveguide W2 in a uniform circular distribution. This means that the filters are arranged offset by 120° or, respectively, 90° relative to one another with the second waveguide centrally located with respect to the sub-filters. In these latter cases, the following relationship is generally valid for the electrically effective length from the filter output up to the inside conductor of the central second waveguide W2:

$$x_m=(r+s/2)/\sin(180/m)-r.$$

In FIGS. 6 and 7, there are illustrated sectional views of a three-channel combining network for the antenna/filter combiner. This three-channel combining network presents an especially beneficial solution in view of its economic feasibility and of the electrically critical length of the filter outputs to the apex WS of the combining network.

In the combining network of FIGS. 6 and 7, a resonator housing 1 is provided, which can be a metal block or a metallic plastic block. Formed in the housing 1 are three blind bores 2 that form resonators.

It can be appreciated that the three blind bores 2 formed in resonator housing 1 are provided in the metal block or in the metallized plastic block circumferentially symmetrically relative to a central through bore 3 that represents the outer conductor of a coaxial line forming a second waveguide W2.

The resonator housing 1 is formed such that the minimum wall thickness between the respective resonators 2 assumes a low, mechanically expedient value. Dielectric resonators DR1, DR2 and DR3 are each respectively centrally secured or fixed on thin-wall tube sections 5 of a suitable microwave insulator in the large resonator housing bores 2. The conductors of the filter outputs A1, A2 and A3 are insulated and extend through suitable bores formed in the wall 3*a* between the resonator housing 1 and the central bore 3 and with an inside conductor 4 of the central coaxial line form the physical apex WS of the combining network. Filter inputs E1, E2 and E3 are offset by 90° at the circumference of the resonator housing relative to the outputs.

As further illustrated, screws K1, K2 and K3 with which the bandwidths of the filters are set are respectively arranged asymmetrically oriented 135° relative to the filter inputs and outputs.

At one end, the central coaxial line 4 comprises a connector 6 for a circulator with channels SK1, SK2 and SK3, whereas, at the other end, the central coaxial line 4 is shorted and connected to the combining network apex WS (i.e., the unification point of the filter output lines and of the inside conductor of the coaxial cable) without any additional space requirement as a residual error compensation. To that end, an inside conductor 7 of the shorted coaxial line is constructed as a slightly bent wire 8 at the end in order to avoid temperature-conditioned or dependent mechanical stresses, and is connected, for example, by clamping to a cover 9 that covers the entire combining network unit. The two-circuit sub-filters of the combining network which are constructed in this case with dielectric resonators DR1, DR2 and DR3 (herein generically referred to as dielectric resonators DR) are operated with orthogonal $HE_{11\delta}$ modes. The transmission attenuation of a sub-filter amounts to approximately $a_0$=2.5 db when resonators having a loss quality of Q≧20,000 are employed.

Disturbances of the transmissive filter—caused by undesirable transformation of the high-impedance input of the blocking filter via the connecting lines between the filter outputs and the second waveguide (at the combining network apex)—are largely compensated for by compensation means providing at that side facing away from the circulator in the second waveguide W2 around which the sub-filters TF are concentrically arranged. Fabricating the housing 1 of the combining network arrangement from a single metal block or, respectively, metallized plastic block yields electrical advantages due to the resulting short and defined connecting paths and also yields a minimum plurality of connecting locations. Mechanical advantages also arise that comprise the resulting compact and space-saving structure and the accommodation of the compensation means without any additional space requirements, as well as defined low tolerance connection. The dielectric resonators DR have a highly selective two-circuit filter operated with orthogonal modes which is especially advantageous from the viewpoint of the high quality and climate demands of the desired compactness and of the excellent economic feasibility in the combining networks of current mobile radio telephone systems.

The desired returnability of each arbitrary sub-filter of the filter combiner to all declared channel frequencies within the system frequency band is achieved without permissible degradation of the filter properties (due, for example, to serious losses in quality or due to the appearance of disturbing modes), this being achieved in that a dielectric resonator DR is formed by two resonator halves having approximately half the thickness (as measured in an axial direction) of a single larger resonator and approximately the same outside dimensions, whereby at least one of the two resonator halves is formed to be displaceable in the axial direction in a defined way relative to the other resonator half, for example, with a system controlled stepping motor, and the size of an air gap 10 between the two resonator halves ultimately defines the center frequency of the two-circuit filter. This displaceability of a resonator half is indicated by a double-direction arrow in FIG. 6.

Although modifications and changes may be suggested by those skilled in the art, it is the intention of the inventors to embody within the patent warranted hereon all changes and modifications as reasonably and properly come within the scope of their contribution to the art.

I claim:

1. An antenna/filter combiner for connecting a plurality of frequency channels to a transmission antenna, comprising:

a waveguide connected to the antenna;

a plurality n of circulators connected in-line in the waveguide;

a plurality n of combining networks connected to the circulators, each dividing network coupled to a respective circulator, each combining network comprising an apex to which are connected a plurality μ of sub-filters, a signal flow direction of the circulators being such that signals forwarded by the combining networks are received by their respective circulators and then operatively forwarded down the waveguide to the transmission antenna, the sub-filters of each combining network comprising high-Q resonators operated in at least two modes, the apex of at least one combining network comprising a second waveguide coupled to its respective circulator and filters having resonators physically arranged concentrically about the second waveguide and having resonator axes positioned axially parallel to an axis of the second waveguide, filter outputs of the filter resonators being coupled to the second waveguide, the second waveguide being a coaxial cable;

a plurality μ of transmission channels connected to the sub-filters of the combining networks, the signal flow direction of the circulators being such that frequency channels already fed into the waveguide at topically preceding circulators 1 to (β−1) in the course of the waveguide are at least approximately totally reflected at the combining network of the $\beta^{th}$ circulator and are forwarded in the direction of the transmission antenna via further circulators (β+1) to n; and compensation means in a transmission channel for compensating disturbances caused by reflecting combining networks, which compensation means are provided in the second waveguide at a side thereof facing away from the circulator, and which disturbances are caused by undesirable transmissions at high impedance inputs of the reflecting combining networks.

2. The antenna/filter combiner of claim 1, wherein the second waveguide is a coaxial line, and the coaxial line is shorted at an end with a protruding inside conductor and attached to a junction of the outputs of the various resonators.

3. The antenna/filter combiner of claim 2, wherein the protruding inside conductor protrudes sufficiently so as to be slightly bent to minimize stressing thereof.

4. The antenna/filter combiner of claim 1, wherein the combining network comprises a housing formed out of a single metal block.

5. The antenna/filter combiner of claim 1, wherein the combining network comprises a housing made out of a metallized plastic block.

6. The antenna/filter combiner of claim 1, wherein a resonator includes a dielectric resonator operated with orthogonal modes formed as a highly selective two-circuit filter.

7. The antenna/filter combiner of claim 6, wherein the dielectric resonator comprises a two-part resonator each part forming a resonator half, each resonator half having approximately the same thickness and approximately the same external dimensions, at least one of the resonator halves being axially displaceable relative to the other resonator half.

8. The antenna/filter combiner of any of claims 1 and 2–7, wherein the combining networks comprise three sub-filter each.

9. The antenna/filter combiner of any of claims 1 and 2–7, wherein the combining networks comprise two sub-filters each.

10. The antenna/filter combiner of any of claims 1 and 2–7, wherein the combining networks comprise four sub-filters each.

* * * * *

UNITED STATES PATENT AND TRADEMARK OFFICE

CERTIFICATE OF CORRECTION

PATENT NO. : 5,546,057

DATED : August 15, 1996

INVENTOR(S) : Gerhard Pfitzenmaier

It is certified that error appears in the above-indentified patent and that said Letters Patent is hereby corrected as shown below:

On the title page of the patent, the Assignee is incorrectly listed:

"Aktiengesellschaft Siemens" should be

--Siemens Aktiengesellschaft--

Signed and Sealed this

Twenty-sixth Day of November 1996

Attest:

Bruce Lehman

BRUCE LEHMAN

*Attesting Officer* *Commissioner of Patents and Trademarks*